(12) United States Patent
Chen

(10) Patent No.: US 7,193,757 B2
(45) Date of Patent: Mar. 20, 2007

(54) ANGLE MULTIPLEXING HOLOGRAPHIC STORAGE DEVICE AND METHOD

(75) Inventor: Tsan-Yuan Chen, Hsinchu (TW)

(73) Assignee: Lite-On It Corp., Taipei (TW)

( * ) Notice: Subject to any disclaimer, the term of this patent is extended or adjusted under 35 U.S.C. 154(b) by 81 days.

(21) Appl. No.: 11/167,645

(22) Filed: Jun. 27, 2005

(65) Prior Publication Data

US 2006/0001936 A1    Jan. 5, 2006

(30) Foreign Application Priority Data

Jun. 30, 2004    (TW) ................................ 93119667 A

(51) Int. Cl.
    *G03H 1/28*  (2006.01)
(52) U.S. Cl. ............................ 359/24; 359/25; 359/35; 365/125; 365/216; 369/103
(58) Field of Classification Search .................. 359/24, 359/25, 35; 365/125, 216, 234; 369/103
    See application file for complete search history.

(56) References Cited

U.S. PATENT DOCUMENTS

| | | | | |
|---|---|---|---|---|
| 6,157,473 A | * | 12/2000 | Jang et al. | ...................... 359/22 |
| 6,700,686 B2 | * | 3/2004 | King et al. | ................... 359/11 |
| 6,798,547 B2 | * | 9/2004 | Wilson et al. | ................ 359/10 |
| 2004/0227927 A1 | * | 11/2004 | Battiato et al. | ................ 356/37 |

\* cited by examiner

*Primary Examiner*—Leonidas Boutsikaris

(57) ABSTRACT

In an angle multiplexing holographic storage device, a movable beam splitter is used for splitting a source beam into an object beam and a reference beam. An encoding device is used for encoding the object beam with pixel data. A parabolic reflector differentially reflects the reference beam with the movement of the movable beam splitter. A holographic storage medium is arranged at the focal point of the parabolic reflector and made to lie in the optical path of the encoded object beam so that the differentially reflected reference beams encounter and interfere with the encoded object beam at the same site of the holographic storage medium to form and record various interference patterns.

20 Claims, 6 Drawing Sheets

ANGLE MULTIPLEXING HOLOGRAPHIC STORAGE DEVICE AND METHOD

FIELD OF THE INVENTION

The present invention relates to holographic storage device and method, and more particularly to angle multiplexing holographic storage device and method.

BACKGROUND OF THE INVENTION

Many data storage media such as optical media or magnetic media have been developed to store data. With the increasing development of digitalized generation, the data storage density for the conventional data storage media is unsatisfactory. Nowadays, for dealing with such a problem, a holographic storage technology is developed by using holographic storage media to store data.

Referring to FIG. 1, the basic concept for implementing a holographic storage technology is shown. An object beam 11 is imprinted with pixel data of a two dimensional array through the encoding operation of a spatial light modulator (SLM) 10. Then, the resulting object beam 11 passes through a lens 16 and interferes with a reference beam 12 to form an interference pattern which is, afterwards, recorded into a holographic storage medium 13. The pixel data recorded in the holographic storage medium 13 can be read out by extracting the object beam with pixel data from the interference pattern.

In the data readout process, the interference pattern previously recorded in the holographic storage medium 13 is subjected to diffraction with the reference beam 12 to generate a reconstructed object beam 15. The reconstructed object beam 15 is directed through a lens 17 and focused on an optical detector 14 such as a charge coupled device. The reconstructed object beam 15 is decoded by the optical detector 14 via photoelectric conversion thereby realizing the pixel data.

In order to further enhance data storage capacity, a volume holographic storage technology was developed. The volume holographic storage technology utilizes multiplexing means to store a large number of holograms in the same spatial region of a holographic storage medium. Angle multiplexing is one of the volume holographic storage technologies for storing a large number of holograms in a single storage medium.

Referring to FIG. 2, an angle multiplexing holographic storage device is schematically shown. The angle multiplexing holographic storage device 200 comprises a laser beam 210, a beam splitter 215, a turning mirror 245, a pattern encoder 255, a lens 280, a holographic storage medium 250, a rotatable address selection mirror 286, an elliptical mirror 288, another lens 284 and an optical detector 281. By the beam splitter 215, a coherent light from the laser source 210 is split into two beams to serve as a reference beam 220 and an object beam 225, respectively. The reference beam 220 is reflected by the rotatable address selection mirror 286 to an elliptical mirror 288. The elliptical mirror 288 has two focal points. The rotatable address selection mirror 286 and the holographic storage medium 250 are located at the first and second focal points of the elliptical mirror 288, respectively. The reference beam 220 reflected from the elliptical mirror 288 is focused on the holographic storage medium 250. The object beam 225 is processed through the reflection of the turning mirror 245 and the encoding operation of the pattern encoder 255, e.g. a spatial light modulator (SLM) to imprint thereon pixel data, and then focused on a particular site on the holographic storage medium 250 via the lens 280. The data-imprinted object beam 225 interferes with the reference beam 220 to form an interference pattern to be recorded in the holographic storage medium 250. By rotating the address selection mirror 286, the incident angle of the reference beam 220 in respect with the holographic storage medium 250 is adjustable. The interference patterns resulting from a certain object beam 225 and reference beams 220 with various incident angles are recorded at the same site on the holographic storage medium 250. In such manner, data storage capacity of the holographic storage medium 250 is largely improved.

For reading pixel data from the holographic storage medium 250, the address selection mirror 286 is rotated differentially to render a reference beam 220 with a desired incident angle. Through the diffraction of one of the interference patterns recorded in the holographic storage medium 250 with the rendered reference beam 220, a reconstructed object beam 282 can be obtained. Then, the reconstructed object beam 282 is directed through the lens 284 and focused on the optical detector 281, which can be a charge coupled device, to be decoded into the pixel data via photoelectric conversion.

Since the angle multiplexing holographic storage device stores holographic data by adjusting the incident angle of the reference beam 220, the rotation of the address selection mirror 286 has to be precisely controlled. It is known to those skilled in the art, however, rotation control is far more difficult than linear control in precision. In other words, the incident angle of the reference beam 220 in respect with the holographic storage medium 250 is hard to be finely adjusted. Therefore, the yield and reliability of the product would be adversely affected.

SUMMARY OF THE INVENTION

The present invention provides angle multiplexing holographic storage device and method capable of adjusting the incident angle of the reference beam with the exemption from rotation control.

The present invention relates to a holographic storage device. The holographic storage device comprises a light source, a movable beam splitter, an encoding and focusing device, a parabolic reflector and a storage medium. The movable beam splitter is used for splitting a source beam such as a coherent laser beam into an object beam and a reference beam. The light source synchronously moves with the beam splitter for providing the beam splitter with the source beam. The light source and the beam splitter are carried on a sled to move linearly in a direction perpendicular to the main axis of the parabolic reflector. The encoding and focusing device comprise a spatial light modulator for encoding the object beam with pixel data and a lens for focusing the encoded object beam on the certain site of the storage medium. The parabolic reflector has a main axis perpendicular to the moving direction of the beam splitter for reflecting the reference beam with a certain angle that is variable with the movement of the beam splitter. The storage medium has a certain site consistent with both a focal point of the parabolic reflector and a focal point of the encoding and focusing device for recording the pixel data at the certain site in the form of an interference pattern of the reference beam with the certain angle and the encoded object beam.

In an embodiment, the holographic storage device can further comprise a reflective mirror downstream of the movable beam splitter to reflect the object beam to the encoding and focusing device when the encoding and focusing device is arranged deflective from the optical path of the object beam.

Examples of the storage medium include disc media and cubic media.

The present invention also relates to an angle multiplexing holographic storage device. The angle multiplexing holographic storage device comprises a movable beam splitter, an encoding device, a parabolic reflector and a storage medium. The movable beam splitter is used for splitting a source beam into an object beam and a reference beam. The encoding device is used for encoding the object beam with pixel data. The parabolic reflector is used for differentially reflecting the reference beam with the movement of the movable beam splitter to encounter and interfere with the encoded object beam to form various interference patterns. The storage medium is disposed at the focal point of the parabolic reflector and lying in the optical path of the encoded object beam for recording the various interference patterns at a certain site thereof. The reflected reference beam and the encoded object beam are focused and interfere with each other at the certain site of the storage medium.

The present invention further relates to a method for recording angle multiplexed holograms in a holographic storage medium. The method comprises steps of: splitting a source beam into a first object beam and a first reference beam; encoding the first object beam and focusing the encoded first object beam on the holographic storage medium at a certain site; reflecting the first reference beam to reach the certain site where the encoded first object beam and the first reference beam have a first angle therebetween and interfere with each other to form a first interference pattern; linearly moving the source beam relative to the holographic storage medium and splitting the source beam into a second object beam and a second reference beam; encoding the second object beam and focusing the encoded second object beam on the holographic storage medium at the certain site; reflecting the second reference beam to reach the certain site where the encoded second object beam and the second reference beam have a second angle therebetween and interfere with each other to form a second interference pattern; and recording both the first and second interference patterns in the holographic storage medium at the certain site.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 1:
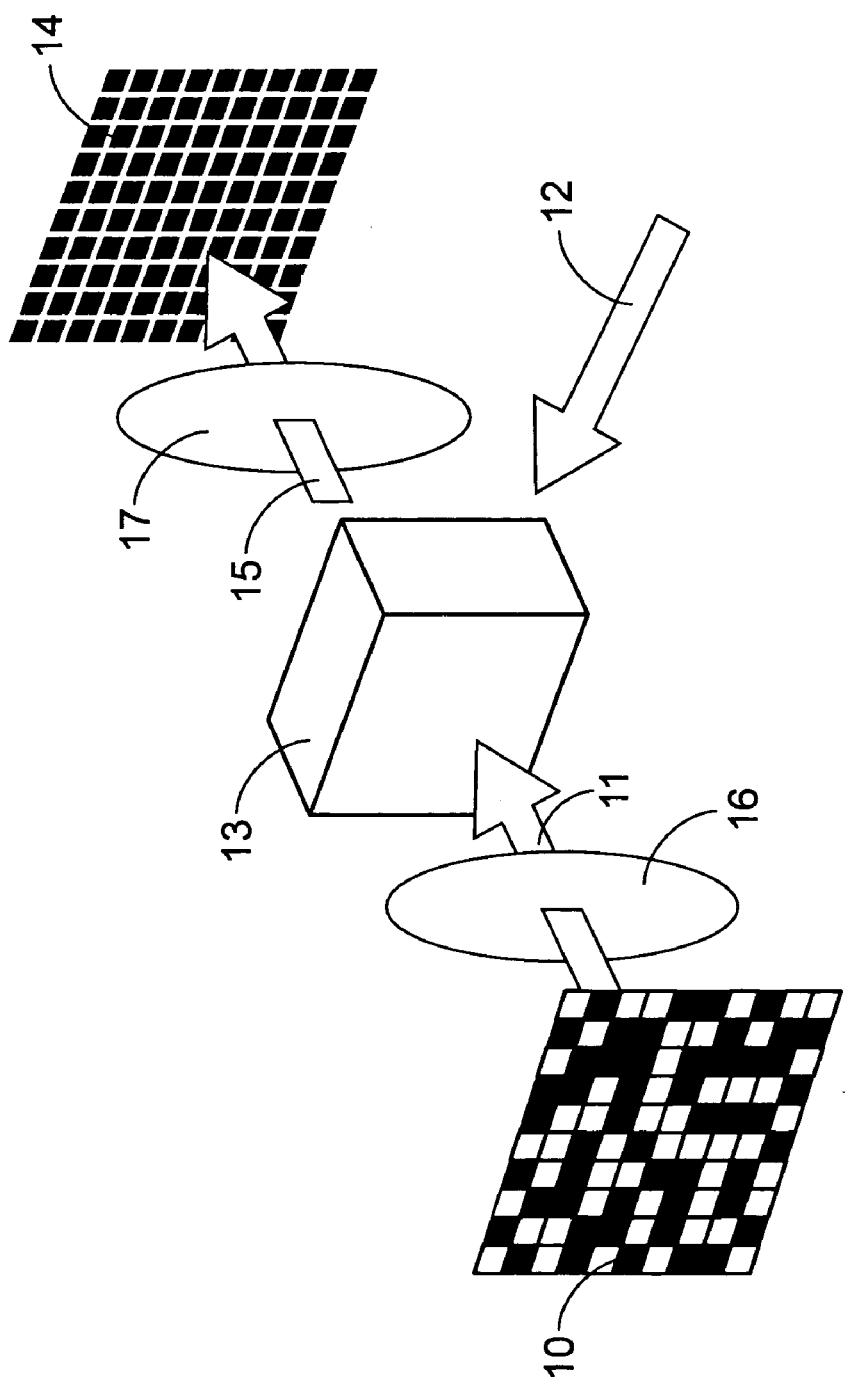
FIG. 1 is a schematic diagram partially illustrating a conventional holographic storage device.
Figure 2:
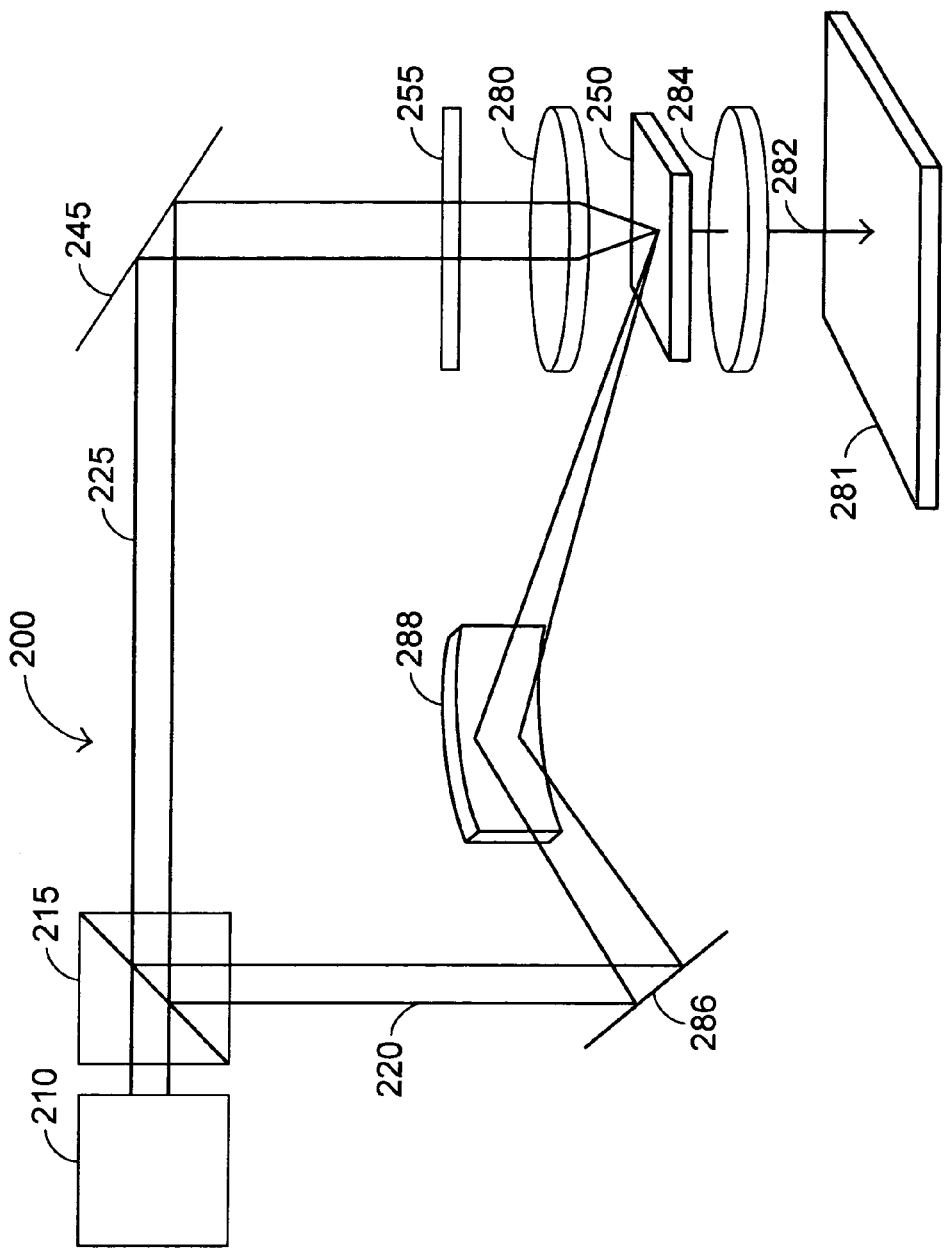
FIG. 2 is a schematic diagram illustrating a conventional angle multiplexing holographic storage device.
Figure 3A:
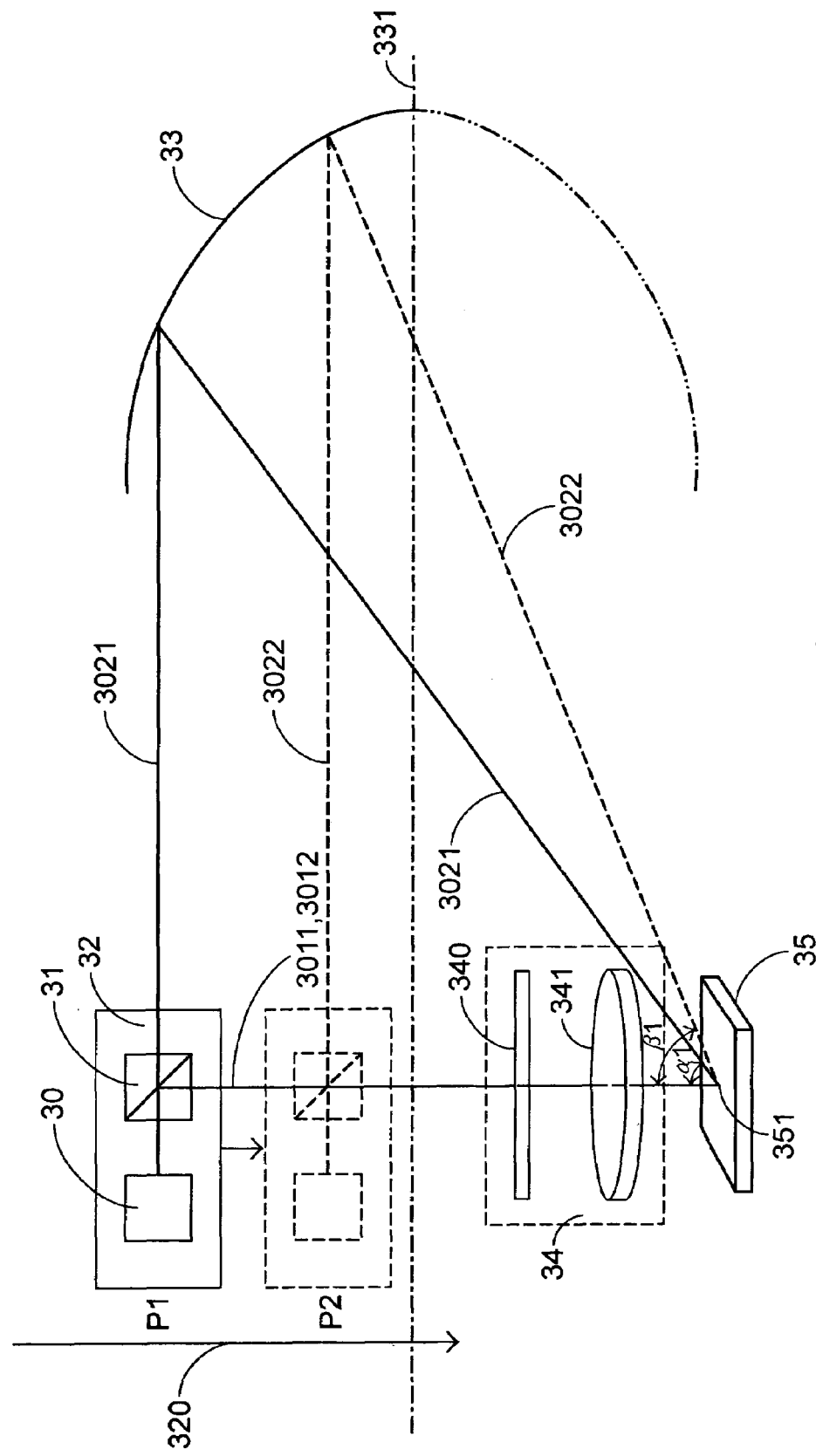
FIG. 3(a) is a schematic diagram illustrating an angle multiplexing holographic storage device according to a first embodiment of the present invention.

Referring to FIG. 3(a), a schematic diagram of an angle multiplexing holographic storage device according to an embodiment of the present invention is illustrated. The angle multiplexing holographic storage device comprises a laser source 30, a beam splitter 31, a parabolic reflector 33, an encoding and focusing device 34 and a holographic storage medium 35. The laser 30 and the beam splitter 31 are carried by a movable member 32 to move synchronously. An exemplary movable member 32 used in the present invention is a sled. The encoding and focusing device 34 comprises a spatial light modulator (SLM) 340 and a lens 341. The parabolic reflector 33 and the lens 341 have been specifically chosen and arranged to have focal points thereof lie on the holographic storage medium 35 at the same site. For example, the parabolic reflector 33 is properly a partial parabolic mirror having a main axis 331 perpendicular to the moving direction 320 of the movable member 32.

When the movable member 32 is located in a first position P1, by means of the beam splitter 31, a coherent light emitted from the laser source 30 is split into two beams to serve as a first reference beam 3021 and a first object beam 3011, respectively. The first reference beam 3021 reflected from the parabolic reflector 33 is focused on the focal point of the parabolic reflector 33 consistent with a certain site 351 of the holographic storage medium 35. On the other hand, the first object beam 3011 is processed by the spatial light modulator (SLM) 340 to imprint thereon first pixel data, and then also focused on the holographic storage medium 35 at the same site 351 via the lens 341. In this circumstance, the encoded first object beam 3011 and the first reference beam 3021 have a first angle a1 therebetween and interfere with each other to form a first interference pattern.

Similarly, when the movable member 32 is moved linearly from the first position P1 toward holographic storage medium 35 in a direction 320 perpendicular to the main axis 331 of the parabolic reflector 33 to reach a second position P2, a coherent light from the laser source 30 is split into two beams to serve as a second reference beam 3022 and a second object beam 3012, respectively. The second reference beam 3022 reflected from the parabolic reflector 33 is also focused on the same site 351 of the holographic storage medium 35 as the first reference beam 3021. The second object beam 3012, on the other hand, will follow the same path as the first object beam and likewise focused on the same site 351 of the holographic storage medium 35 via the lens 341 after being imprinted with second pixel data by the spatial light modulator (SLM) 340. In this circumstance, the encoded second object beam 3012 and the second reference beam 3022 have a second angle β1 therebetween and interfere with each other to form a second interference pattern. Since the interference patterns resulting from the object beam and varied reference beams are recorded at the same site on the holographic storage medium 35, data storage capacity of the holographic storage medium 35 is largely improved.

Subsequently, for reading first or second pixel data from the holographic storage medium 35 recorded in the holographic storage medium 35, the corresponding one of the first and second reference beams 3021 and 3022 is referred to decode the associated interference pattern, thereby reconstructing the first or second object beam 3011, 3012. The reference beams 3021 and 3022, which have different incident angles to the holographic storage medium 35, can be derived on the conditions that the movable member 32 are located at the position P1 and P2, respectively. Through the diffraction of the interference pattern with the associated reference beam 3021 or 3022, the desired object beam 3011 or 3012 can be reconstructed. Then, the reconstructed object beam is directed through another lens (not shown) and focused on an optical detector (not shown) such as a charge coupled device to be decoded into the pixel data of a two dimensional array via photoelectric conversion.

In the above embodiment, the angle multiplexing holographic storage device of the present invention can store holographic data by varying the incident angles of the reference beams 3021 and 3022 in respect with the holographic storage medium 35. Moreover, these incident angles are adjustable with linear movement of the movable member 32. Since linear control is much easier than conventional rotation control in precision, the yield and reliability of the product can be enhanced.

Figure 3B:
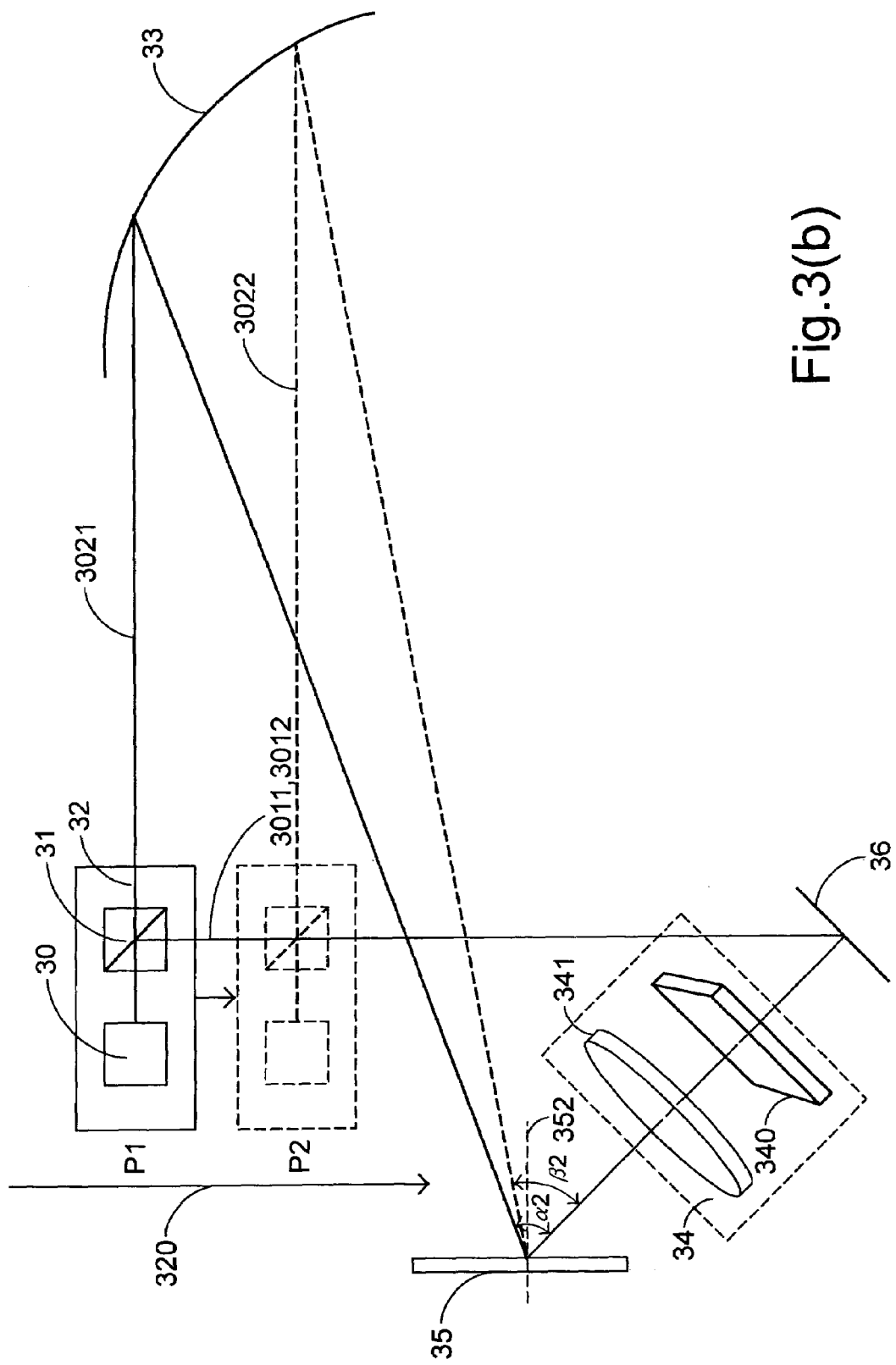
FIG. 3(b) is a schematic diagram illustrating an angle multiplexing holographic storage device according to a second embodiment of the present invention.

A further embodiment of an angle multiplexing holographic storage device is illustrated in FIG. 3(*b*). In this embodiment, the laser source 30, the beam splitter 31, the movable member 32, the parabolic reflector 33, the encoding and focusing device 34 and the holographic storage medium 35 included therein are similar to those shown in FIG. 3(*a*), and are not to be redundantly described herein. Like the embodiment of FIG. 3(*a*), when the movable member 32 is moved from the first position P1 to the second position P2, the angle α2 between the reference beam 3021 and object beam 3011 projected or focused on the storage medium 35 and the angle β2 between the reference beam 3022 and object beam 3012 projected or focused on the storage medium 35 can be made different so as to result in different interference patterns. In this embodiment, the encoding and focusing device 34 and the holographic storage medium 35 are made deflective from the optical path of the object beam, and a reflective mirror 36 is additionally arranged downstream of the beam splitter 31 to reflect the object beam 3011 or 3012 to the holographic storage medium 35 via the encoding and focusing device 34. In this way, the first object beam 3011 and first reference beam 3021 can be oppositely incident to the holographic storage medium 35 relative to a normal line 352 of the holographic storage medium 35, and the second object beam 3021 and second reference beam 3022 are oppositely incident to the holographic storage medium 35 relative to the normal line 352 of the holographic storage medium 35. This embodiment is thus advantageous in that the reference beam can vary in a wider angle range so as to result in higher data storage capacity. It is also understood that the position of the reflective mirror 36 can be adjusted according to the manufacturer's design as long as the focal points of the parabolic reflector 33 and the lens 341 lie on the holographic storage medium 35 at the same site where the object beam and corresponding reference beam can interference with each other.

Figure 4A:
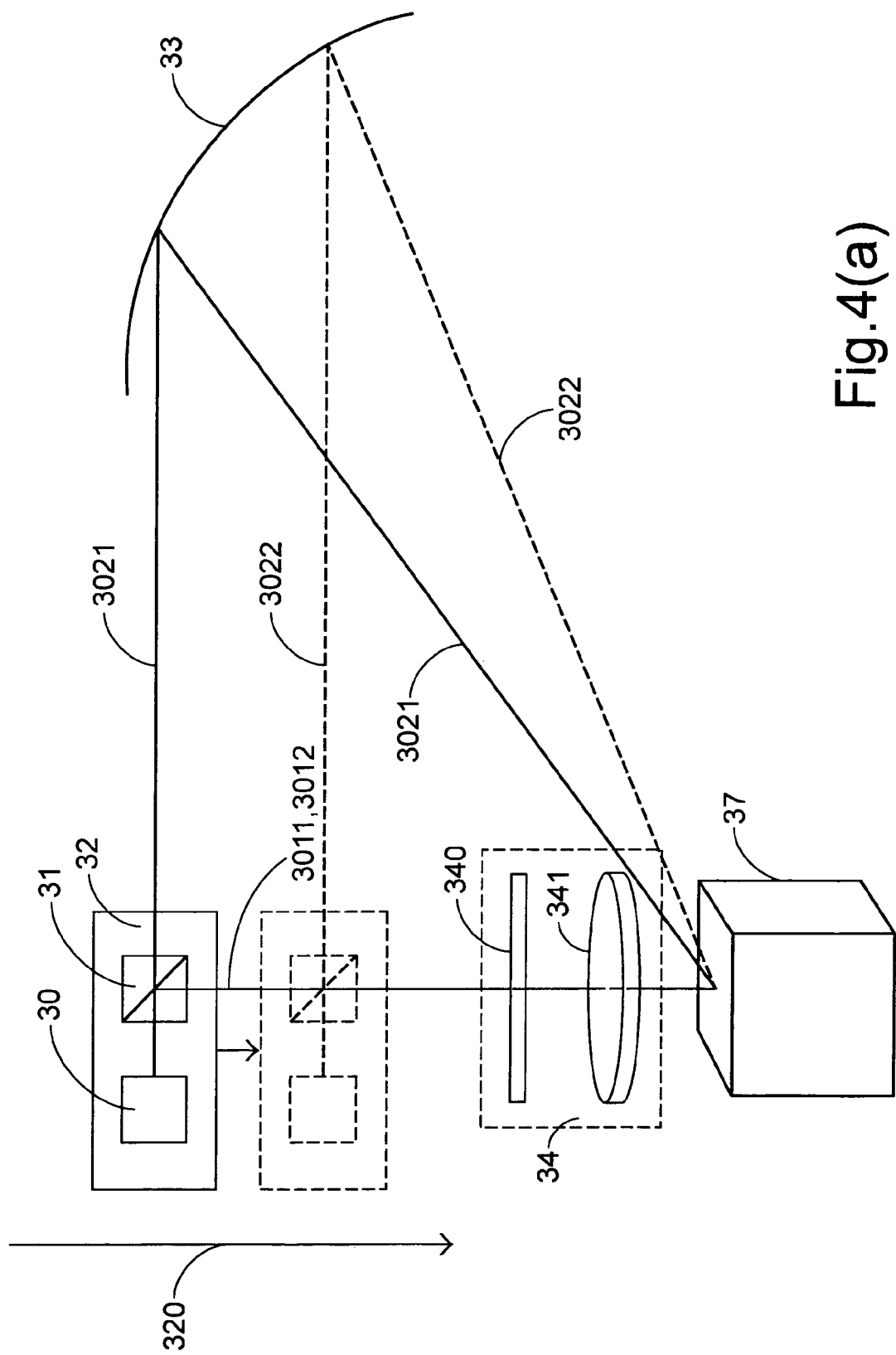
FIG. 4(a) is a schematic diagram illustrating an alternative application of the angle multiplexing holographic storage device of FIG. 3(a)
Figure 4B:
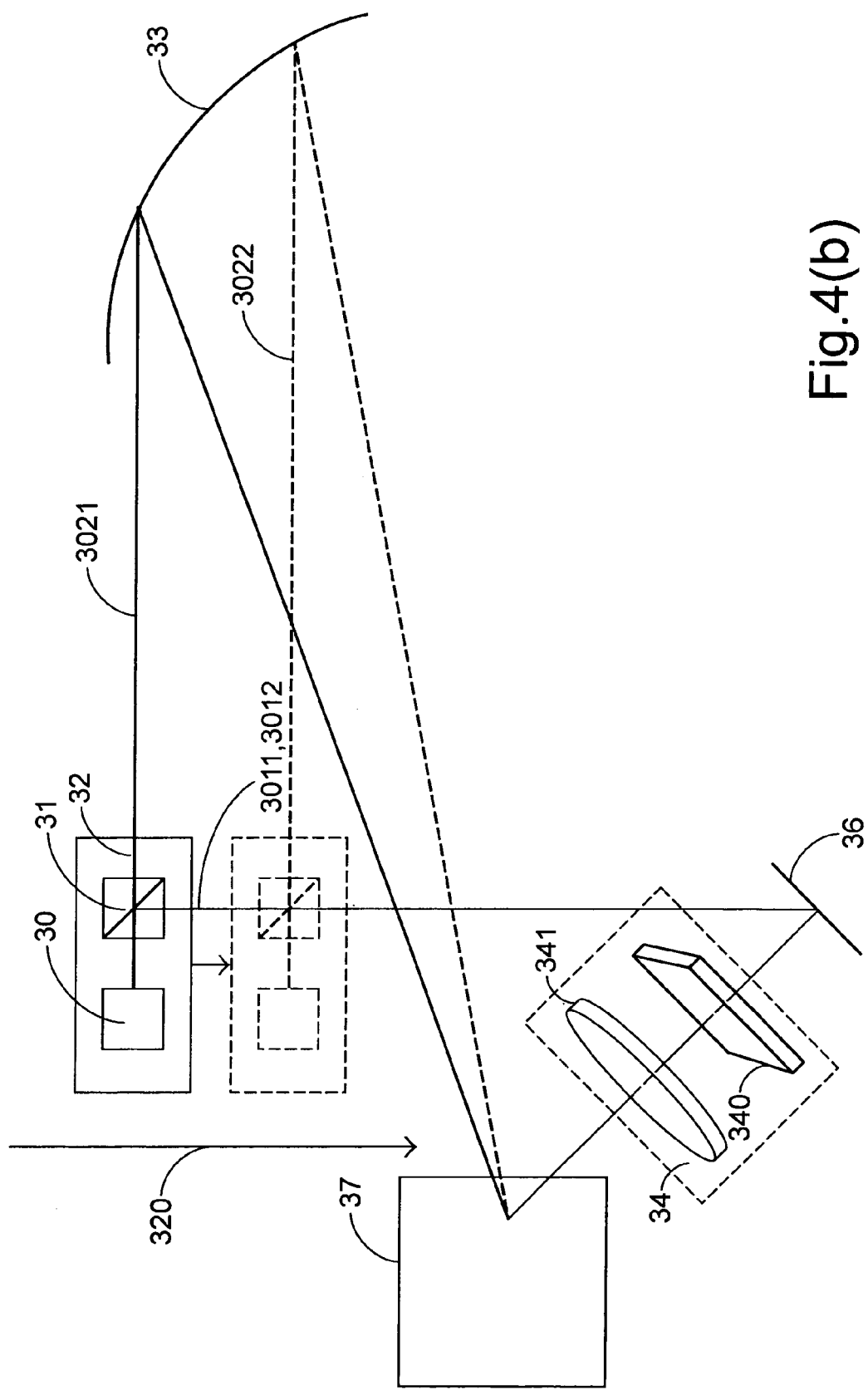
FIG. 4(b) is a schematic diagram illustrating an alternative application of the angle multiplexing holographic storage device of FIG. 3(b).

FIGS. 4(*a*) and 4(*b*) are schematic diagrams illustrating alternative applications of the angle multiplexing holographic storage device of FIGS. 3(*a*) and 3(*b*), respectively. Instead of the disc-type holographic storage media 35, cubic holographic storage media 37 are used in the angle multiplexing holographic storage devices of FIGS. 4(*a*) and 4(*b*) to store more data.

From the above description, the angle multiplexing holographic storage device and method of the present invention are capable of adjusting the incident angle of the reference beam in a linear control fashion so as to enhance the yield and reliability of the products.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A holographic storage device comprising:
    a movable beam splitter for splitting a source beam into an object beam and a reference beam;
    an encoding and focusing device for encoding said object beam with pixel data and focusing said encoded object beam;
    a parabolic reflector having a main axis perpendicular to the moving direction of said beam splitter for reflecting said reference beam with a certain angle that is variable with the movement of said beam splitter; and
    a storage medium having a certain site consistent with both a focal point of said parabolic reflector and a focal point of said encoding and focusing device for recording said pixel data at said certain site in the form of an interference pattern of said reference beam with said certain angle and said encoded object beam.

2. The holographic storage device according to claim 1 further comprising a light source synchronously moving with said beam splitter for providing said beam splitter with said source beam.

3. The holographic storage device according to claim 1 further comprising a sled for carrying said light source and said beam splitter to move linearly in a direction perpendicular to said main axis of said parabolic reflector.

4. The holographic storage device according to claim 1 wherein said source beam is a coherent laser beam.

5. The holographic storage device according to claim 1 further comprising a reflective mirror downstream of said movable beam splitter for reflecting said object beam to said encoding and focusing device when said encoding and focusing device is arranged deflective from the optical path of said object beam.

6. The holographic storage device according to claim 1 wherein said encoding and focusing device comprises:
    a spatial light modulator for encoding said object beam; and
    a lens for focusing said encoded object beam on said certain site of said storage medium.

7. The holographic storage device according to claim 1 wherein said storage medium is a disc or cubic medium.

8. An angle multiplexing holographic storage device comprising:
    a movable beam splitter for splitting a source beam into an object beam and a reference beam;
    an encoding device for encoding said object beam with pixel data;
    a parabolic reflector for differentially reflecting said reference beam with the movement of said movable beam splitter to encounter and interfere with said encoded object beam to form various interference patterns; and
    a storage medium disposed at the focal point of said parabolic reflector and lying in the optical path of said encoded object beam for recording said various interference patterns at a certain site thereof.

9. The angle multiplexing holographic storage device according to claim 8 further comprising a light source synchronously moving with said beam splitter for providing said beam splitter with said source beam.

10. The angle multiplexing holographic storage device according to claim 8 further comprising a sled for carrying said light source and said beam splitter to move linearly in a direction perpendicular to a main axis of said parabolic reflector.

11. The angle multiplexing holographic storage device according to claim 8 wherein said source beam is a coherent laser beam.

12. The angle multiplexing holographic storage device according to claim 8 further comprising a reflective mirror downstream of said movable beam splitter to reflect said object beam to said encoding device.

13. The angle multiplexing holographic storage device according to claim 8 wherein said encoding device is a spatial light modulator.

14. The angle multiplexing holographic storage device according to claim 8 further comprising
a lens downstream of said encoding device for focusing said encoded object beam onto said certain site of said storage medium.

15. The angle multiplexing holographic storage device according to claim 8 wherein said reflected reference beam and said encoded object beam are focused and interfere with each other at said certain site of said storage medium.

16. A method for recording angle multiplexed holograms in a holographic storage medium, said method comprising steps of:
splitting a source beam into a first object beam and a first reference beam;
encoding said first object beam and focusing said encoded first object beam on the holographic storage medium at a certain site;
reflecting said first reference beam to reach said certain site where said encoded first object beam and said first reference beam have a first angle therebetween and interfere with each other to form a first interference pattern;
linearly moving said source beam relative to the holographic storage medium and splitting said source beam into a second object beam and a second reference beam;
encoding said second object beam and focusing said encoded second object beam on the holographic storage medium at said certain site;
reflecting said second reference beam to reach said certain site where said encoded second object beam and said second reference beam have a second angle therebetween and interfere with each other to form a second interference pattern; and
recording both said first and second interference patterns in the holographic storage medium at said certain site.

17. The method according to claim 16 wherein said source beam is moved in a direction parallel to said first object beam and split in a manner that said second object beam overlaps the optical path of said first object beam and said second reference beam is parallel to the optical path of said first reference beam.

18. The method according to claim 17 wherein the holographic storage medium is located in the optical path of said first and/or second object beam, and said first and second reference beams are reflected in a manner that said second angle is greater than said first angle when said source beam is moved toward the holographic storage medium.

19. The method according to claim 17 further comprising a step of reflecting said first and/or second object beams to a direction feasible for said encoding and focusing steps when the holographic storage medium is not located in the optical path of said first and/or second object beam.

20. The method according to claim 19 wherein said first object beam and said first reference beam are oppositely incident to the holographic storage medium relative to a normal line of the holographic storage medium, and said second object beam and said second reference beam are oppositely incident to the holographic storage medium relative to said normal line of the holographic storage medium.

* * * * *